(12) United States Patent
Rusting et al.

(10) Patent No.: US 7,090,258 B2
(45) Date of Patent: Aug. 15, 2006

(54) SEALING SOCKET AND METHOD FOR ARRANGING A SEALING SOCKET TO A TUBE

(75) Inventors: Frans Rusting, Alkmaar (NL); Petrus Paulus Antonius Catharina Pex, Den Helder (NL); Jacobus Anna Josephus Peters, Alkmaar (NL); Gerard De Jong, Schagen (NL)

(73) Assignee: Stiching Energieonderzoek Centrum Nederland, Le Patten (NL)

( * ) Notice: Subject to any disclaimer, the term of this patent is extended or adjusted under 35 U.S.C. 154(b) by 0 days.

(21) Appl. No.: 10/204,698

(22) PCT Filed: Feb. 23, 2001

(86) PCT No.: PCT/NL01/00153

§ 371 (c)(1),
(2), (4) Date: Dec. 16, 2002

(87) PCT Pub. No.: WO01/63162

PCT Pub. Date: Aug. 30, 2001

(65) Prior Publication Data

US 2003/0146625 A1  Aug. 7, 2003

(30) Foreign Application Priority Data

Feb. 24, 2000 (EP) ................................. 00200641

(51) Int. Cl.
*F16L 19/00* (2006.01)
*F16L 21/02* (2006.01)
*F16L 13/02* (2006.01)

(52) U.S. Cl. ...................... 285/338; 285/343; 285/356; 285/901; 285/288.1

(58) Field of Classification Search ................ 285/338, 285/342, 343, 354, 351, 340, 901, 356, 288.1, 285/288.5
See application file for complete search history.

(56) References Cited

U.S. PATENT DOCUMENTS

| | | | | | |
|---|---|---|---|---|---|
| 1,804,856 | A | * | 5/1931 | Boutry | 285/341 |
| 1,822,056 | A | * | 9/1931 | Noble | 285/340 |
| 1,995,109 | A | * | 3/1935 | Smittle | 285/266 |
| 2,163,810 | A | * | 6/1939 | Raybould | 285/232 |
| 2,215,476 | A | * | 9/1940 | Peters | 403/268 |
| 2,459,608 | A | * | 1/1949 | Wolfram | 285/340 |
| 3,058,760 | A | * | 10/1962 | Bankowski | 285/196 |
| 3,406,986 | A | | 10/1968 | Jennings | |
| 3,432,175 | A | * | 3/1969 | Kawai | 277/619 |
| 3,879,065 | A | * | 4/1975 | Kobayashi | 285/39 |
| 4,082,321 | A | | 4/1978 | Nakajima et al. | |
| 4,593,943 | A | * | 6/1986 | Hama et al. | 285/308 |
| 4,621,841 | A | | 11/1986 | Wakefield | |
| 4,699,405 | A | * | 10/1987 | Miller | 285/338 |
| 5,496,076 | A | * | 3/1996 | Lin | 285/110 |

(Continued)

FOREIGN PATENT DOCUMENTS

DE 689 405 3/1940

(Continued)

*Primary Examiner*—James M. Hewitt
(74) *Attorney, Agent, or Firm*—Young & Thompson

(57) ABSTRACT

Sealing socket (1) and method for arranging a sealing socket to a tube (2). A sealing socket (1) includes a sleeve (3) having an outer dimension somewhat larger than the tube (2) to be sealed, defining an annular compartment (4) between the tube (2) and the sleeve (3), in which a gasket (6) is introduced. The gasket material is pressurised by a ring (7) which is permanently connected by welding (8) to the sleeve (3).

19 Claims, 2 Drawing Sheets

U.S. PATENT DOCUMENTS

| | | |
|---|---|---|
| 5,538,256 A | 7/1996 | Rinne |
| 5,738,385 A | 4/1998 | Homann et al. |
| 6,273,478 B1 * | 8/2001 | Benett et al. ............... 285/346 |
| 6,641,178 B1 * | 11/2003 | Gowing ..................... 285/347 |

FOREIGN PATENT DOCUMENTS

| | | |
|---|---|---|
| GB | 492334 | 9/1938 |

* cited by examiner

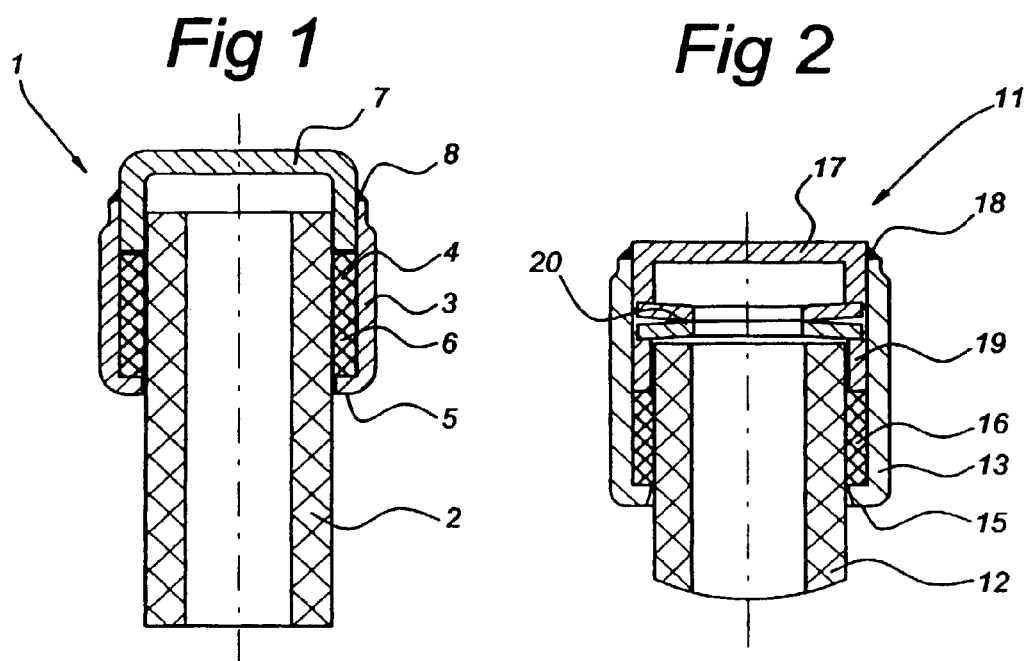
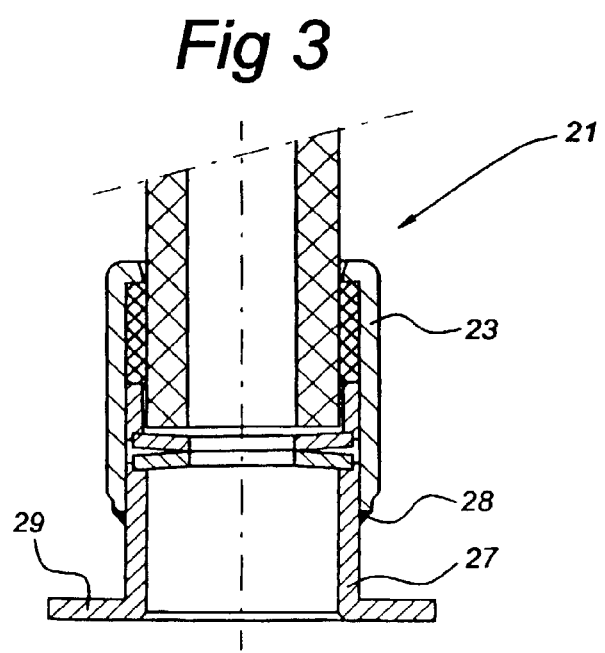

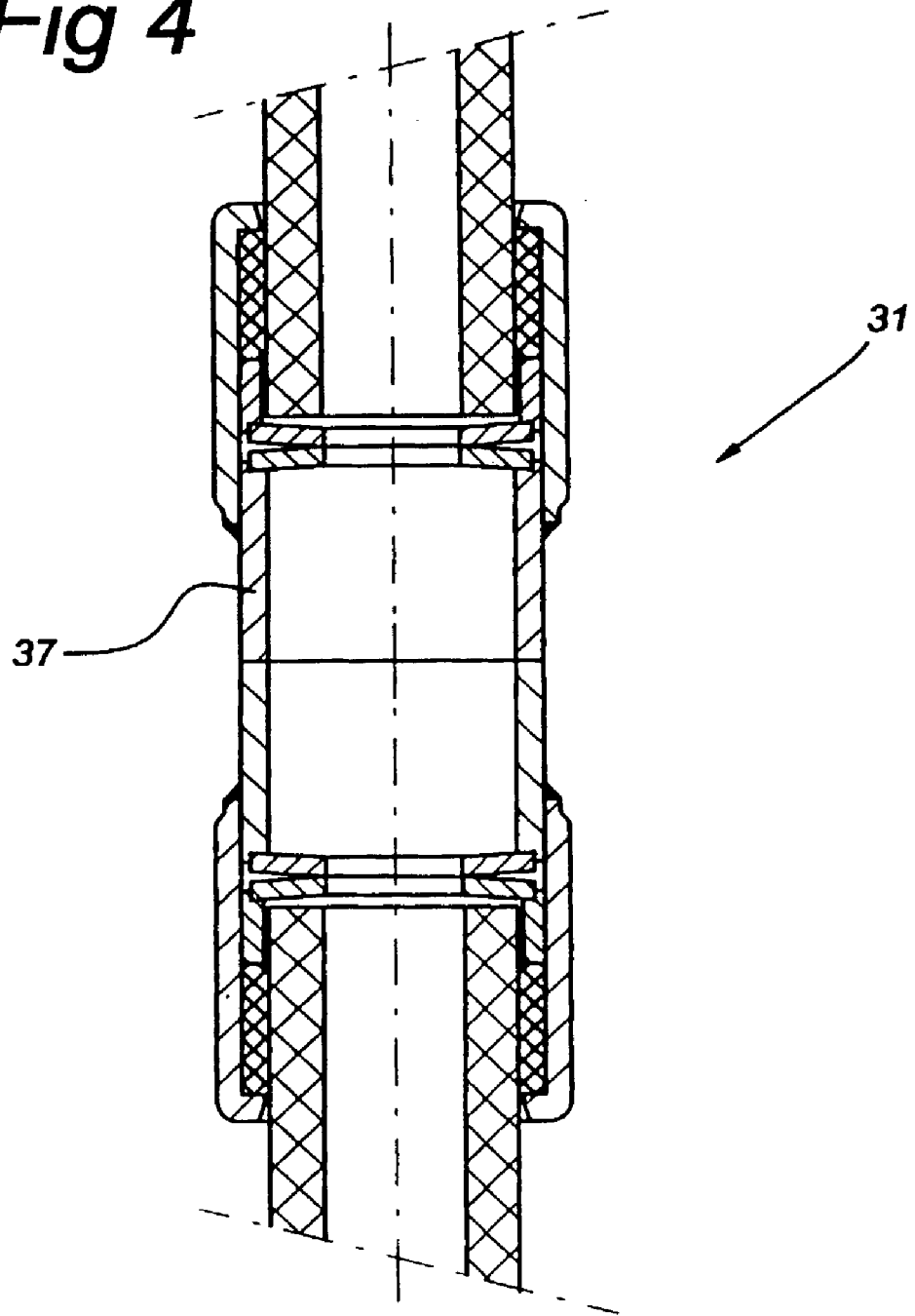

SEALING SOCKET AND METHOD FOR ARRANGING A SEALING SOCKET TO A TUBE

BACKGROUND OF THE INVENTION

The invention relates to sealing socket for a tube, comprising a metallic sleeve part defining a compartment in which a gasket of deformable material is received, said compartment comprising in axial direction of said sleeve part an endclosure for axial defining of said compartment, said compartment being provided in axial direction at the end remote from the endclosure with a gland or gasket pressurising means. Such sealing sockets are generally known. Generally, a pressure member is used to introduce some pretension in the gasket or gland material to provide a sealing between the tube and sleeve to compensate for changes in relative dimensions between the parts to be sealed.

DESCRIPTION OF THE RELATED ART

From the German patent specification 689405 a connection between two tubes is known. Either one of the tubes is provided with an widened end section or a socket is provided. In both cases between one tube and the widened end section/socket respectively, a sealing material is introduced on which pressure is exerted by a ring. This ring is put under pressure through bending over of part of the widened section, socket respectively. The ring is fully enclosed in the compartment so formed. The strength of the end section, socket respectively is increased by a weld which is provided before the ring is put under tension.

SUMMARY OF THE INVENTION

Most general subject invention aims to provide a sealing to be used in combination with a tube and a further part.

More specifically, subject invention aims to provide a sealing socket to be used in combination with a ceramic tube which is used at elevated temperature and pressure. Such sealing socket can be used for providing an enclosure or a connector between a ceramic tube and other parts to overcome the mechanical instability problem due to the difference in thermal coefficient of expansion and the brittle nature of ceramics. This sealing socket is dealing with this problem and when permanently connected to the ceramic tube the combination of them behaves as one component. This component can then be connected to other part by normal state of the art techniques. For example normal metal to metal connections can be used if the sealing socket and the other part are both made from stainless steal. The connection between a ceramic tube and a metallic part is always critical. Pretensioning of the gasket material is essential in such applications because of considerable differences in thermal coefficient of expansion between for example ceramic material and stainless steel which is generally used for the sleeve and the gland. It is important that such a pretension is maintained in applications wherein thermal cycling occurs. Further problems encountered are thermal degradation in high temperature application of the gasket or chemical attack of the gland material through the medium in which the tube is used. Normally elastomer O-rings are used, but such gaskets are relatively expensive and are vulnerable for chemical attack and/or high temperature.

The invention aims to provide a sealing socket which can effectively be used in combination with a ceramic tube to be sealed, is cheap to produce and can withstand most operation conditions encountered in the use of ceramic tubes. According to the invention this is realised in that said gasket pressure means comprise a pressurising ring being connected with said sleeve through a permanent joint and extends partly in said compartment extending from said connection in one direction in said compartment and in the other direction outside of said compartment.

According to the invention a permanent connection between the pressure ring and the sleeve is provided. This in contrast to the prior art wherein thread connections are used and pretensioning is obtained by the threaded parts. A permanent connection is a connection which can not be disassembled without destroying the related part. Such a permanent connection can comprise clamping, glueing and pressing. It can also for example be obtained by welding. This weld can comprise a number of spots but it is also possible to realise a continuous weld. In the last case there is a complete sealing between the pressure ring and the sleeve preventing ingress of aggressive substances in the gland area of the socket.

According to the invention the sealable socket is combined with a tube by first introducing the sleeve around the tube. This tube can comprise any material such as ceramic material. At the same time, or subsequently the gasket, for example comprising graphite material, can be positioned in the annulus between the sleeve and the ceramic tube. After that the pressure ring is introduced engaging directly or through further pressurising means such as disk springs, the gasket. A precompression force is provided over the gasket material by bringing the pressure ring (gland) and sleeve together. In the correct position pressure ring and sleeve are connected to each other by welding. After welding the compressive force is removed and the predetermined compression force in the gasket is provided.

Preferably, graphite is used as gland material. This is relatively cheap, chemical inert and high temperature proof material. Preferably, graphite is used having different properties in different directions.

As indicated above it is possible to use additional pressurising means such as disk springs. The choice of such pressurising means is, of course, dependant from the temperature, pressure and other environmental conditions prevailing during use of the sealing socket according to the invention.

Although the invention has been elucidated above referring to a ceramic tube, it should be clear that it can also be used in combination with any other kind of tubular member.

BRIEF DESCRIPTION OF THE DRAWINGS

The invention will be further elucidated referring to some preferred embodiments of the invention shown in the drawing, wherein:

FIG. 1 shows a first embodiment of an end piece of the invention in cross-section;

FIG. 2 shows a second embodiment of an end piece according to the invention in cross-section;

FIG. 3 shows a connecting piece in cross-section according to the invention; and FIG. 4 shows a further embodiment of a connecting piece for two tubes according to the invention in cross-section.

DESCRIPTION OF THE PREFERRED EMBODIMENS

In FIG. 1 an end piece according to the invention is generally referred to by 1. It is designed to be connected to a ceramic tube 2. The end piece 1 according to the invention comprises a sleeve part 3 which has a bend over part 5. A gasket pressurising ring or gland 7 is connected to sleeve part 3 by weld 8. Compartment or stuffing box 4 is defined between sleeve part 3, bend over part 5 and the free extremity of gasket pressurising ring 7 and the tube. In this compartment a gasket is introduced. Sealing is effected between this gasket 6 and ceramic tube 2 and gland 7 and sleeve 3.

According to the invention a gasket is put under pressure by gasket pressurising ring 7 which is welded to sleeve part 3. Because of the use of a weld 8 the gasket material is substantially sealed from environmental effects. The end piece according to the invention is embodied to be used at a relatively high temperature and high pressure. For example tests have shown that an operation temperature above 200° C. will not give any sealing problems.

The sleeve part and gasket pressurising ring can be made of any material which can be connected by welding, preferably steel and more particular stainless steel.

Generally both the material of the sleeve part and gasket pressurising ring and the gasket material will be chosen such that the coefficient of expansion approaches the thermal coefficient of expansion of the ceramic tube material.

According to the invention the sealing gasket is realised by first assembling the several parts on the ceramic tube to be sealed, pressurising the gasket and only after that weld 8 is provided.

For the gland material preferably graphite is used which has a relatively large modulus of elasticity. Preferably graphite is used having unidirectional properties i.e. having a relatively large coefficient of expansion in radial direction and a relatively smaller coefficient of expansion in axial direction. Before realising the connection between the gasket pressurising ring 7 and sleeve part 3 compression is introduced between those two parts in a direction towards each other. It is possible to immediately realise welding after compression has been effected, but is also possible to provide a time delay to have the gasket settle. Generally heat input during welding is not desirable and because of that plasma or laser welding can be used. If the gasket is used at elevated temperature and or a considerable difference in thermal coefficient of expansion between the end piece and more particular the gasket and the ceramic tube exists, it might be preferable to provide additional means to assure that pressure will be maintained at both lower and elevated temperature. To that end the embodiment according to FIG. 2 is proposed. The end piece is generally referred to by 11 and comprises a sleeve part 13, a bend over part 15, a gasket 16 and a gasket presurising ring 17 which is connected to sleeve part 13 by welding. The weld obtained is preferably a continuous weld with seals relative to the environment.

The gasket is not in direct contact with gasket pressurising ring 17. Both a pressure distribution ring 19 and one or two disk springs 20 are positioned between the gasket and gasket pressurising ring 17. Through the use of a disk spring, differences in thermal coefficient of expansion between the ceramic tube 12 and end piece 11 can be compensated for assuring a constant pressure at different circumstances during the service life of the related part.

FIG. 3 shows an embodiment wherein the device according to the invention is realised as connecting piece. This is shown by 21. The structure of this connecting piece is basically the same as shown in FIG. 2. However, gasket pressurising ring 27 is not closed at its end but provided is an opening as well as a flange 29 for connecting to a further part. The weld between gasket pressurising ring 27 and sleeve part 23 is referred to by 28.

FIG. 4 shows a further embodiment of a connecting piece 31. This embodiment uses, as the gasket pressurizing ring 7, 17, 27 found respectively in FIGS. 1–3, a fluid connection ring 37 which substantially corresponds with two end pieces as shown in FIG. 3. However, in contrast to the end pieces of FIG. 3, the fluid connection ring 37 is an open tube being common for both ceramic tubes. As shown in the drawing, the fluid connection ring 37 may comprise two half-tubes 37 where first the connection between sleeve 3 and each half-tube 37 is made. Only after that, both half-tubes 37 are connected together. Of course it is possible to start from a single fluid connection ring 37 and connecting each sleeve 3 to the fluid connection ring 37 after introduction of the tubes.

If the combination of stainless steel and a graphite gasket material is used such a graphite gasket could be compressed in the compartment with a force for example being at least two times the pressure (difference) under operational conditions of the ceramic tube. Such a pressure could be at least 10 MPa. It will be obvious that the clearance between the free extremity of the bend over part and the outer circumference of the ceramic tube should be as small as possible.

It is possible to use pure material without binders or fillers so that there is no loss of volume at high temperature. As indicated above preferable a gasket material is used having different thermal expansion coefficient in different directions. For example it is possible to obtain a graphite material having an thermal coefficient of expansion of $1 \times 10^{-6}$/K in the direction parallel to the axis of the ceramic tube while the thermal coefficient of expansion is $30 \times 10^{-6}$/K in the direction perpendicular thereto.

From the above description the person skilled in the art will immediately be able to design further embodiments with components generally available in the prior art. Such further embodiments are within the range of the enclosed claims.

The invention claimed is:

1. Sealing socket for a tube, comprising:
 a sleeve part defining a compartment in which a deformable gasket is received,
 said sleeve part comprising a bent over part extending in the radial direction for axially defining of said compartment,
 said compartment being provided with gasket pressurising means in the axial direction at the end remote from the bent over part,
 said gasket pressurising means comprising a pressurising ring being connected with said sleeve part through a circumferential continuous permanent weld joint in contact with the pressurising ring and the sleeve part and the pressurising ring extending from said weld joint connection into said compartment in one direction and to outside said compartment in the other direction, the pressurising ring being closed at its end that is outside said compartment.

2. Socket according to claim 1, wherein said gasket comprises graphite material.

3. Socket according to claim 1, wherein said gasket pressurising means comprise spring means arranged between said gasket and said pressurising ring.

4. Socket according to claim 3, wherein said spring means comprises a disk spring.

5. Socket according to claim 1 wherein said sleeve part comprises stainless steel.

6. Assembly comprising a sealing socket according to claim 1, provided at the extremity of a tube.

7. Method for connecting a sealing socket to a tube, comprising:
   providing a sleeve part over said tube, said sleeve part defining a compartment,
   introducing a gasket in said compartment and pressurising said gasket to provide a sealing between said tube and said sleeve part by introducing a pressure ring in said sleeve part engaging said gasket,
   after pressurising said gasket, providing a continuous permanent weld contacting said pressure ring and said sleeve part,
   said pressure ring extending within said compartment and outside of said compartment, the pressurising ring being closed at its end that is outside said compartment,
   wherein, the sleeve part comprises an end portion extending in the radial direction for axially defining said compartment.

8. Method according to claim 7, wherein further pressurising means are introduced between said gasket and said pressure ring.

9. A tube assembly, comprising:
   a tube having an open first end, an interior cylindrical surface and an exterior cylindrical surface;
   a sleeve part fitting around the open end of the tube, externally to the tube and providing a stuffing compartment intermediate the external surface of the tube and an internal surface of the sleeve part;
   a gasket located in the stuffing compartment;
   a gasket pressurizing ring fitted around the open first end and extending into an interior of the sleeve part, the gasket pressurizing ring acting against the gasket to hold the gasket under pressure and form a fluid-tight seal within the stuffing compartment, the pressurizing ring being closed at its end that is outside said compartment; and
   a continuous weld contacting an externally exposed surface of the gasket pressurizing ring and an externally exposed end edge of the sleeve part,
   the weld isolating the gasket from external environmental effects,
   wherein, the sleeve part comprises an end portion extending in the radial direction for axially defining said stuffing compartment.

10. The assembly of claim 9, wherein,
    the tube is a ceramic tube,
    the gasket is graphite, and
    the sleeve part and gasket pressurizing ring are stainless steel.

11. The assembly of claim 9, further comprising:
    a spring located intermediate the sleeve part and the gasket pressurizing ring such that the gasket pressurizing ring avoids contact with the gasket.

12. The assembly of claim 9, further comprising:
    an internal ring located intermediate the tube and the sleeve part, a first edge of the internal ring bearing against an edge of the gasket, a second, opposite end of the internal ring having a circumferential notch;
    a first spring engaged with the circumferential notch of the internal ring and located intermediate the sleeve part and the gasket pressurizing ring; and
    a second spring bearing against the first spring and engaged in a circumferential notch of the gasket pressurizing ring,
    the gasket pressurizing ring being free of direct contact with the gasket.

13. Sealing socket assembly, comprising:
    a stainless steel sleeve part fitting over a ceramic tube, the sleeve part defining a compartment in which a graphite deformable gasket is received between the sleeve part and the tube,
    said sleeve part comprising, in the axial direction, an end closure for axially defining of said compartment,
    said compartment being provided in the axial direction at the end remote from the end closure with gasket pressurizing means,
    said gasket pressurizing means comprising a stainless steel pressurizing ring being connected with said sleeve part through a circumferential continuous permanent weld joint in contact with the pressurizing ring and the sleeve part and the pressurizing ring extending from said weld joint connection into said compartment in one direction and outside of said compartment in the other direction.

14. Socket assembly according to claim 13, wherein said pressurizing ring comprises a connector.

15. Socket assembly according to claim 14, wherein said connector comprises a flange remote from said weld joint.

16. Socket assembly according to claim 14, wherein said connector connects the tube to another tube contained within another stainless steel sleeve part defining another compartment in which another deformable gasket is received between the another sleeve part and the another tube,
    said another sleeve part comprising, in the axial direction, another end closure for axially defining of said another compartment,
    said another compartment being provided in the axial direction at the end remote from the another end closure with another gasket pressurizing means,
    said another gasket pressurizing means comprising another pressurizing ring being connected with said another sleeve part through another circumferential continuous permanent weld joint in contact with the another pressurizing ring and the another sleeve part and the another pressurizing ring extending from said another weld joint connection into said another compartment in the other direction and outside of said another compartment in the one direction.

17. Socket assembly according to claim 13, further comprising:
    a spring located intermediate the sleeve part and the gasket pressurizing ring such that the gasket pressurizing ring avoids contact with the gasket.

18. Socket assembly according to claim 13, further comprising:
    an internal ring located intermediate the tube and the sleeve part, a first edge of the internal ring bearing against an edge of the gasket, a second, opposite end of the internal ring having a circumferential notch;
    a first spring engaged with the circumferential notch of the internal ring and located intermediate the sleeve part and the gasket pressurizing ring; and a second spring bearing against the first spring and engaged in a circumferential notch of the gasket pressurizing ring, the gasket pressurizing ring being free of direct contact with the gasket.

19. Sealing socket assembly, comprising:

a tube;

a fluid connection ring open at two ends to allow a flow of fluid, the fluid connection ring in fluid communication with said tube;

a sealing socket connecting said tube to said fluid connection ring, said sealing socket comprising a deformable gasket;

a sleeve part defining a compartment in which the deformable gasket is received, said sleeve part comprising a bent over end closure part extending in the radial direction for axially defining of said compartment; and a gasket pressurizing means provided in said compartment in the axial direction at the end remote from the bent over end closure part, said gasket pressurizing means comprising a pressuring ring portion of said fluid connection ring, the pressuring ring portion of said fluid connection ring being in fluid communication with said tube and connected with said sleeve part through a circumferential continuous permanent weld joint in contact with said fluid connection ring and said sleeve part, said pressuring ring portion of said fluid connection ring extending from said weld joint connection into said compartment in one direction and to outside said compartment in the other direction.

* * * * *